(12) United States Patent
Yang et al.

(10) Patent No.: US 7,888,425 B2
(45) Date of Patent: Feb. 15, 2011

(54) LOW VOLATILE ORGANIC COMPOUND STABLE SOLVENT-BASED POLYURETHANE COMPOSITIONS FOR COATINGS

(75) Inventors: Shi Yang, Cary, NC (US); Kristy Magyar, Cary, NC (US); D. Michael Ingle, San Diego, CA (US); Glenn Petschke, Raleigh, NC (US)

(73) Assignee: Reichhold, Inc., Research Triangle Park, NC (US)

( * ) Notice: Subject to any disclaimer, the term of this patent is extended or adjusted under 35 U.S.C. 154(b) by 721 days.

(21) Appl. No.: 11/125,656

(22) Filed: May 10, 2005

(65) Prior Publication Data

US 2006/0014891 A1    Jan. 19, 2006

Related U.S. Application Data

(60) Provisional application No. 60/588,525, filed on Jul. 16, 2004.

(51) Int. Cl.
*C08G 18/08* (2006.01)
*C08L 75/00* (2006.01)
*C08L 83/00* (2006.01)

(52) U.S. Cl. .................. 524/589; 524/588
(58) Field of Classification Search ............ 524/589
See application file for complete search history.

(56) References Cited

U.S. PATENT DOCUMENTS

| | | | |
|---|---|---|---|
| 2,970,062 A * | 1/1961 | Hauge et al. ............. 106/252 |
| 3,022,326 A * | 2/1962 | Schroeder et al. ........... 554/30 |
| 3,632,557 A * | 1/1972 | Brode ...................... 528/28 |
| 3,920,595 A * | 11/1975 | Anderson et al. .......... 523/400 |
| 4,032,487 A * | 6/1977 | Columbus ................. 524/44 |
| 4,067,844 A * | 1/1978 | Barron et al. ............. 525/453 |
| 4,222,925 A * | 9/1980 | Bryant et al. ............. 524/589 |
| 4,254,228 A * | 3/1981 | Kleimann et al. .......... 521/128 |
| 4,313,858 A * | 2/1982 | Earing et al. ............. 524/313 |
| 4,329,490 A * | 5/1982 | Williams et al. ............ 560/90 |
| 4,345,053 A * | 8/1982 | Rizk et al. ............... 525/440 |
| 4,374,237 A * | 2/1983 | Berger et al. .............. 528/28 |
| 4,508,889 A * | 4/1985 | Noren et al. ............... 528/28 |
| 4,625,012 A * | 11/1986 | Rizk et al. ................ 528/28 |
| 4,645,816 A * | 2/1987 | Pohl et al. ................ 528/28 |
| 4,687,533 A * | 8/1987 | Rizk et al. .............. 156/307.3 |
| 4,749,803 A * | 6/1988 | Dowbenko et al. ......... 556/414 |
| 4,760,098 A * | 7/1988 | Miutel ..................... 521/82 |
| 4,767,814 A * | 8/1988 | Bae et al. ................. 524/284 |
| 4,793,886 A * | 12/1988 | Okamura et al. ......... 156/307.3 |
| 4,798,878 A * | 1/1989 | Brinkmann et al. .......... 528/28 |
| 4,818,789 A * | 4/1989 | Tomko et al. .............. 525/64 |
| 4,874,805 A * | 10/1989 | Mulhaupt et al. ........... 524/188 |
| 4,960,844 A * | 10/1990 | Singh ..................... 528/17 |
| 4,978,706 A * | 12/1990 | Dietlein et al. ........... 524/423 |
| 5,097,053 A * | 3/1992 | Baghdachi et al. ......... 556/420 |
| 5,158,988 A * | 10/1992 | Kurita et al. .............. 522/64 |
| 5,225,512 A * | 7/1993 | Baghdachi et al. .......... 528/28 |
| 5,272,224 A * | 12/1993 | Baghdachi et al. ......... 525/460 |
| 5,466,772 A * | 11/1995 | Angelmayer et al. ........ 528/73 |
| 5,580,715 A * | 12/1996 | McGrath et al. ............ 435/5 |
| 5,580,947 A * | 12/1996 | Brahm et al. .............. 528/75 |
| 5,693,715 A * | 12/1997 | Kodali ................... 525/190 |
| 5,750,751 A * | 5/1998 | Saam ..................... 554/165 |
| 5,985,952 A * | 11/1999 | Levy ..................... 522/102 |
| 5,985,956 A * | 11/1999 | Barsotti et al. ........... 523/435 |
| 5,990,257 A * | 11/1999 | Johnston et al. ............ 528/28 |
| 6,020,408 A * | 2/2000 | Suzuki et al. ............. 524/265 |
| 6,042,943 A * | 3/2000 | Levy ..................... 428/378 |
| 6,046,270 A * | 4/2000 | Roesler et al. ............ 524/590 |
| 6,046,298 A * | 4/2000 | Beuer et al. .............. 528/74.5 |
| 6,051,633 A * | 4/2000 | Tomko et al. ............. 523/507 |
| 6,080,810 A * | 6/2000 | Ribarits et al. ........... 524/496 |
| 6,127,462 A * | 10/2000 | Chen et al. ............... 524/114 |
| 6,133,395 A * | 10/2000 | Miyata et al. .............. 528/28 |
| 6,162,938 A * | 12/2000 | Hansen et al. ............ 556/419 |
| 6,221,938 B1 * | 4/2001 | Chen et al. ............... 524/114 |
| 6,239,209 B1 * | 5/2001 | Yang et al. ............... 524/507 |
| 6,331,597 B1 * | 12/2001 | Drumright et al. ......... 525/333.5 |
| 6,369,139 B1 * | 4/2002 | Osterholtz et al. .......... 524/114 |
| 6,395,856 B1 * | 5/2002 | Petty et al. ................ 528/24 |
| 6,440,573 B1 * | 8/2002 | Hansen et al. ............ 428/447 |
| 6,475,329 B1 * | 11/2002 | Johnson et al. .......... 156/307.5 |
| 6,657,035 B1 * | 12/2003 | Nakata et al. .............. 528/18 |
| 6,936,655 B2 * | 8/2005 | Borke et al. .............. 524/521 |
| 2004/0048976 A1* | 3/2004 | Bremser et al. ............ 524/589 |
| 2004/0198885 A1* | 10/2004 | Okamoto et al. ............ 524/394 |
| 2005/0049343 A1* | 3/2005 | Borke et al. .............. 524/366 |
| 2005/0137322 A1* | 6/2005 | Roesler et al. ............ 524/589 |
| 2005/0282976 A1* | 12/2005 | Haitko et al. ............. 525/476 |
| 2006/0182957 A1* | 8/2006 | Simons .................. 428/355 R |

OTHER PUBLICATIONS

Isocyanate-Free Moisture Cure Coatings. JCT vol. 74/932, Sep. 2002.*
Isocyanate-Free Moisture Cure Coatings. JCT vol. 74/932. Sep. 2002. (from Springerlink).*
Isocyanate-free moisture cure coatings. J. Baghdachi. JCT. Sep. 2002; 74, 932. p. 81-87.*

* cited by examiner

*Primary Examiner*—Mark Eashoo
*Assistant Examiner*—Peter F Godenschwager
(74) *Attorney, Agent, or Firm*—Myers Bigel Sibley & Sajovec, PA

(57) ABSTRACT

Dual-crosslinkable urethanes including urethanes having air curable ethylenic unsaturation and at least one moisture curable functionalized group exhibit good strength, chemical stability, and hardness and can be made by incorporating moisture curable functionalized groups into ethylenically unsaturated urethanes.

29 Claims, No Drawings

LOW VOLATILE ORGANIC COMPOUND STABLE SOLVENT-BASED POLYURETHANE COMPOSITIONS FOR COATINGS

CROSS-REFERENCE TO RELATED APPLICATIONS

This application claims the benefit of, and incorporates herein by reference in its entirety, the following U.S. Provisional Application: U.S. Provisional Application No. 60/588,525, filed Jul. 16, 2004.

FIELD OF THE INVENTION

This invention relates to polyurethane polymers and particularly to solvent-based crosslinkable polymers and dual-crosslinkable polymers.

BACKGROUND OF THE INVENTION

Unsaturated oil and fatty acid have been widely used in the coating industry due to the ability of air oxidative crosslinking to form a crosslinked coating polymer. This chemistry has also been used to modify urethane to make oil-modified urethanes (OMU) and alkyd modified urethanes (uralkyd). The major advantages of the OMU and uralkyd coatings include one package stable systems. It has been known that OMU and uralkyd coatings exhibit excellent resistance to abrasion, chemicals and solvents. Conventional OMUs or uralkyds prepared in organic solvent are relatively low molecular weight polymers. The low molecular weight polymers are formulated with metallic driers that function as crosslinking catalysts. When these formulated polymers are applied as clear or pigmented coatings to a surface, the organic solvent evaporates and the film is crosslinked by air oxidation at room temperature through the ethylenic unsaturation in the oil or fatty acid to form a tough, crosslinked polymer film. The coating mixtures are stable in the absence of air or oxygen. These characteristics have made the solvent-based OMU and uralkyd widely used for wood floor coatings and trim varnishes for many years.

There has been regulatory pressure to reduce the volatile organic compound (VOC) emissions from coatings due to the use of organic solvents. One of the common methods used to reduce the VOCs is to increase the solids content of the coating materials. To maintain the rheological properties of higher solids content oil-modified urethanes at the same levels as the lower solids content oil-modified urethanes, the molecular weight of the oil-modified urethanes is decreased. In general, matching the overall performance of higher molecular weight polymers using a lower molecular weight polymer is difficult. There are drawbacks of the lower molecular weight oil-modified urethanes which include a longer drying time and a softer polymer film.

Polyurethanes formed by the reaction of isocyanates with polyols can be used for coating materials. Coatings from polyurethanes usually have good resistance to abrasion and chemicals, along with some flexibility and hardness. Although polymers in polyurethane coatings can have high molecular weights, such as urethane lacquers and polyurethane dispersions, many of the polymers used in urethane coatings are oligomers, which have low molecular weights. These low molecular weight urethanes may be cured or crosslinked during or after film formation. For instance, oil-modified urethane can be cured by air oxidation. Additionally, moisture-cured urethane can be cured by the reaction between isocyanate with moisture in air. Two-component urethane can be cured by the reaction between isocyanate groups with active hydrogen compound such as a hydroxyl or an amine. A radiation curable urethane can be cured by radiation in the presence of photo-initiator. Generally, problems exist with urethane lacquers as these lacquers do not have high solid content and good chemical resistance. Two-component and radiation curable urethanes have been found not to be convenient for use for consumers, as these along with isocyanate terminated moisture-cure urethanes are not very easy to handle. Thus, such coatings are not well suited for do-it-yourself wood coating applications.

The most widely used coating materials for wood floor do-it-yourself coatings remains solvent-based oil-modified urethane or urethane modified oil coatings. U.S. Pat. No. 2,970,062, for example, proposes to react drying or semi-drying vegetable oil with polyhydroxy alcohol to make a diol-ester intermediate. The resultant diol ester intermediate then reacts with a polyisocyanate at a controlled ratio in aromatic organic solvent. The final solvent-based oil-modified urethane is a stable system for coatings and adhesives. U.S. Pat. No. 3,022,326 proposes to incorporate 8-50% polyethylene or polypropylene glycol to urethane modified vegetable oil to make a solvent-based fast dry polymer film for coatings with improved flexibility. However, these and the oil-modified urethanes suggested in U.S. Pat. No. 2,970,062 are relatively low in non-volatile and high in viscosity, and are not suitable for low VOC coatings.

Government regulation, of volatile organic compounds in coating products mandates the reduction of the amount of organic solvent in the products. In the effort to reduce the amount of solvent, high solids oil-modified urethanes or uralkyds are being used. High solids oil modified urethane or uralkyds are achieved mainly by decreasing the molecular weight of the polymer or by the use of reactive diluents that may contain two or more functional groups per molecule that are capable of air oxidation. Crosslinking occurs between both the reactive diluent and the polymer itself. However, it is very difficult for the high solids oil-modified urethane or uralkyd to match the performance of the conventional one due to the slow dry and soft film. To overcome these problems, a second curing reaction is considered for introduction into high solids oil-modified urethane or uralkyd to make storage stable dual-cure urethanes.

U.S. Pat. No. 5,693,715 describes the polymerization of dicyclopentadiene and linseed oil to produce a linseed oil-cyclopentadiene copolymer. This copolymer can be used by itself as an air curable vehicle or blended with a second polymeric vehicle as a reactive diluent for coating binder. However, this product dries slowly.

U.S. Pat. No. 5,580,947 describes to the reaction of isophorone diisocyanate or other aliphatic diisocyanates with olefinically unsaturated carboxylic acid to make an amide containing oligomer for room temperature oxidative cure one-component coatings. These oligomers dry slowly.

U.S. Pat. Nos. 4,067,844; 4,222,925; 4,374,237; 4,687,533; 4,749,803; 4,793,886; 4,798,878; 4,874,805; 4,960,844; 4,978,706; 5,097,053; 5,272,224; 5,225,512; and 6,133,395 propose moisture-curable components that contain silane-terminated polyurethane for sealant and adhesives. These systems are stable in the absence of moisture. The incorporation of the silane groups into the sealants or adhesives is accomplished through silane-containing acrylic monomers, amino-silanes, chain transfer agents, isocyanate-silanes and epoxy-silanes. The silane groups are hydrolyzed by the moisture in atmosphere first to form silanols and then the silanols react with polyol or undergo self-condensation to form polymers.

U.S. Pat. No. 4,508,889 proposes the addition of polyisocyanate into a mixture of an amino-silane and a hydroxyl-functional polyol to make a silane-containing isocyanate-terminated polyurethane. This polyurethane is a moisture-curable urethane that can be used as adhesives and coatings.

Isocyanate-free moisture cure polyurethane coatings have been discussed in the publication (JCT, 2000 74(932) 81-87). The silane end-capped polyurethane utilizes a polyol derived from soybean oil. This isocyanate-free moisture polyurethane cures rapidly at room temperature.

Although many different technologies have been proposed for silane moisture curable coatings for sealant, adhesive, and coating applications, none of the above taught combining the silane moisture curable technology with conventional air oxidative curing technology to make dual curable storage stable 1k binders for coatings.

SUMMARY OF THE INVENTION

Embodiments of the present invention relate to polyurethane polymers and particularly to solvent-based crosslinkable polymers and dual-crosslinkable polymers. More particularly, embodiments of the present invention relate to dual-crosslinkable urethanes such as oil-modified urethanes and uralkyds, and methods for producing dual-crosslinkable urethanes.

According to embodiments of the present invention, a coating composition includes a dual-crosslinkable urethane, which includes a urethane having an air curable ethylenic unsaturated portion and one or more moisture curable functionalized groups. The air curable ethylenic unsaturation may be produced from dry or semi-dry oils or fatty acids. The one or more moisture curable functionalized groups may include terminal or pendent silane groups, isocyanate groups, or a combination of silane and isocyanate groups.

In some embodiments of the present invention, the moisture curable functionalized groups are incorporated into the urethane through a reaction of an amino-silane with an isocyanate-terminated urethane prepolymer. In other embodiments, the moisture curable functionalized groups are incorporated into the urethane through a reaction of an isocyanate-silane with a hydroxyl-terminated urethane polyol. In still other embodiments, the moisture curable functionalized groups are incorporated into the urethane through a reaction of an epoxy-silane with carboxylic acid groups of a urethane polymer.

Embodiments of the present invention can also include compositions that include a dual-crosslinkable urethane wherein the composition has a solids content of not less than about 60 percent. In other embodiments, the compositions are storage stable. In still other embodiments, the compositions contain low amounts of volatile organic compounds. The compositions can be used as wood coatings, varnishes, and the like.

According to other embodiments of the present invention, dual-crosslinkable urethanes may be produced by reacting an isocyanate with a hydroxyl functional oil-ester to form urethanes having ethylenic unsaturation and by incorporating one or more silane groups into the ethylenically unsaturated urethane. The hydroxyl functional oil-esters can include hydroxyl values of about 100 to about 250. In some embodiments, the isocyanate is reacted with a hydroxyl functional oil-ester in a ratio of about 0.3 to about 3.0 NCO to OH.

Oil-esters, according to embodiments of the present invention, may be produced by the esterification of a polyfunctional alcohol with a fatty acid. In other embodiments, the oil-esters are produced by the transesterification of a polyfunctional alcohol with an oil that is at least partially unsaturated.

In still other embodiments of the present invention, a composition including a dual-crosslinkable urethane having air curable ethylenic unsaturated portions and one or more moisture curable functional groups also can include a low molecular weight reactive silane capable of crosslinking or co-crosslinking with the dual-crosslinkable urethane.

DETAILED DESCRIPTION OF THE INVENTION

The present invention will now be described more fully hereinafter with reference to the accompanying figures, in which preferred embodiments of the invention are illustrated. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety.

"Alkyl" as used herein alone or as part of another group, refers to a straight or branched chain hydrocarbon containing from 1 to 10 carbon atoms. Representative examples of alkyl include, but are not limited to, methyl, ethyl, n-propyl, iso-propyl, n-butyl, sec-butyl, iso-butyl, tert-butyl, n-pentyl, iso-pentyl, neopentyl, n-hexyl, 3-methylhexyl, 2,2-dimethylpentyl, 2,3-dimethylpentyl, n-heptyl, n-octyl, n-nonyl, n-decyl, and the like.

"Lower alkyl" as used herein, is a subset of alkyl, in some embodiments preferred, and refers to a straight or branched chain hydrocarbon group containing from 1 to 4 carbon atoms. Representative examples of lower alkyl include, but are not limited to, methyl, ethyl, n-propyl, iso-propyl, n-butyl, iso-butyl, tert-butyl, and the like. Alkyl and lower alkyl groups may be unsubstituted or substituted one or more times with halo, alkyl, haloalkyl, alkenyl, alkynyl, cycloalkyl, cycloalkylalkyl, aryl, arylalkyl, heterocyclo, heterocycloalkyl, hydroxyl, alkoxy, alkenyloxy, alkynyloxy, haloalkoxy, cycloalkoxy, cycloalkylalkyloxy, aryloxy, arylalkyloxy, heterocyclooxy, heterocyclolalkyloxy, mercapto, alkyl-S(O)m, haloalkyl-S(O)m, alkenyl-S(O)m, alkynyl-S(O)m, cycloalkyl-S(O)m, cycloalkylalkyl-S(O)m, aryl-S(O)m, arylalkyl-S(O)m, heterocyclo-S(O)m, heterocycloalkyl-S(O)m, amino, alkylamino, alkenylamino, alkynylamino, haloalkylamino, cycloalkylamino, cycloalkylalkylamino, arylamino, arylalkylamino, heterocycloamino, heterocycloalkylamino, disubstituted-amino, acylamino, acyloxy, ester, amide, sulfonamide, urea, alkoxyacylamino, aminoacyloxy, nitro or cyano where m=0, 1 or 2.

"Alkenyl" as used herein alone or as part of another group, refers to a straight or branched chain hydrocarbon containing from 1 to 10 carbon atoms which include 1 to 4 double bonds in the normal chain. Representative examples of Alkenyl include, but are not limited to, vinyl, 2-propenyl, 3-butenyl, 2-butenyl, 4-pentyl, 3-pentyl, 2-hexenyl, 3-hexenyl, 2,4-heptadiene, and the like. These groups may be optionally substituted in like manner as described with alkyl above.

"Alkynyl" as used herein alone or as part of another group, refers to a straight or branched chain hydrocarbon containing from 1 to 10 carbon atoms which include 1 triple bond in the normal chain. Representative examples of Alkynyl include, but are not limited to, 2-propynyl, 3-butynyl, 2- butynyl, 4-pentenyl, 3-pentenyl, and the like. These groups may be optionally substituted in like manner as described with alkyl above.

"Alkoxy," as used herein alone or as part of another group, refers to an alkyl group, as defined herein, appended to the parent molecular moiety through an oxy group. Representative examples of alkoxy include, but are not limited to, methoxy, ethoxy, propoxy, 2-propoxy, butoxy, tert-butoxy, pentyloxy, hexyloxy and the like.

"Acyl" or "Alkanoyl" as used herein alone or as p art of another group, refers to a —C(O)R radical, where R is any suitable substituent such as alkyl, alkenyl, alkynyl, aryl, alkylaryl, etc. as given herein.

Embodiments of the present invention can include a reduction in the number of volatile organic compounds in oil-modified urethanes and uralkyds by incorporating additional crosslinkable functional groups into an oil-modified urethane or uralkyd. The additional crosslinkable functional groups may include silanes that can be hydrolyzed by moisture in the air at room temperature. The silanol groups can undergo self-condensation with each other, or co-condensation with hydroxyl groups of a resin, to form Si—O—Si or Si—O—C bonds. Resin coatings produced from dual-crosslinkable oil-modified urethanes and uralkyds are useful as low volatile organic compound coatings and may be provide in single-package systems that can dry fast and generate hard films for wood floor coatings and other applications.

Embodiments of the present invention can also relate to dual-crosslinkable urethanes that include air curable ethylenic unsaturated portions and at least one moisture curable functionalized group. The ethylenic unsaturated portions of the dual-crosslinkable urethane compositions can result from the presence of dry or semi-dry oils or fatty acids in a urethane composition. The moisture curable functionalized groups can include silane groups, isocyanate groups, or combinations of silane and isocyanate groups.

In some of the embodiments of the present invention, the dual-crosslinkable urethane may be an oil-modified urethane. In other embodiments, the dual-crosslinkable urethane may be an alkyd-modified urethane. Other embodiments of the present invention can include methods for forming dual-crosslinkable oil-modified urethanes and alkyd-modified urethane. Although various embodiments of the present invention may be specifically described with respect to an oil-modified urethane or an uralkyd, it is understood that the embodiments of the present invention may apply to both oil-modified urethanes and uralkyds.

According to some of the embodiments of the present invention, a dual-crosslinkable oil modified urethane or uralkyd can be prepared from the reaction of an isocyanate, such as a diisocyanate, with a hydroxyl-functional oil-ester. The isocyanate and hydroxyl-functional oil-ester can be reacted in a mole ratio of about 0.3 to about 3.0 NCO to OH.

The oil-esters according to embodiments of the present invention are generally the esterification or transesterification products resulting from a drying fatty acid or a drying oil, dibasic acid, and polyol. According to some embodiments, the oil-esters may be formed by a reaction of an aromatic or aliphatic polyfunctional alcohol having two or more hydroxyl groups per molecule with a fatty acid. A portion of the fatty acid is can be unsaturated and can also include a polyacid. In other embodiments, the oil-ester is prepared by the transesterification of an oil with a polyfunctional alcohol containing two or more hydroxyl groups per molecule. The reaction of an alcohol with an acid or an oil can be catalyzed with catalysts according to some embodiments of the present invention. The oil-esters of the embodiments of the present invention can have a hydroxyl value of about 100 to about 250.

Suitable polyfunctional alcohols that can be used to form the oil-esters of various embodiments of the present invention include, but are not limited to, ethylene glycol, propylene glycol, 1,3 propane diol, 1,3 butylene diol, bisphenol-A, hydrogenated bisphenol-A, trimethylolpropane, trimethylolethane, pentaerythritol, glycerin, neopentyl glycol, cyclohexane dimethanol, 2-methyl-1,3-propanediol, 1,6-hexanediol di-pentaerythritol, di-ethylene glycol, tri-ethylene glycol, di-trimethylolpropane and mixtures thereof.

Suitable unsaturated fatty acids that can be used with embodiments of the present invention include, but are not limited to, carbon containing acids, linoleic acids, palmitoleic acids, linolenic acids, eleostearic acids, arachidonic acids, ricinoleic acids, and mixtures thereof.

It is optional for a portion of the oil-ester to be modified by a polyacid. The polyacid can include, but is not limited to, isophthalic acid, terephthalic acid, 5-(sodiosulfo)-isophthalic acid, trimellitic anhydride, adipic acid, 1,4-cyclohexyl dicarboxylic acid, succinic anhydride, maleic acid, fumaric acid, succinic acid, azaleic acid, sebacic acid, methyl succinic anhydride, dodecenyl succinic anhydride, tetrahydrophthalic anhydride, hexahydrophthalic anhydride and phthalic anhydride.

Oils that can be used to form the oil-esters of various embodiments of the present invention include, but are not limited to, linseed oil, soybean oil, sunflower oil, safflower oil, tall oil, tung oil, sardine oil, olive oil, cottonseed oil, dehydrated caster oils, and mixtures thereof.

Catalysts that can be used with embodiments of the present invention to promote the reaction of an alcohol with an acid or oil may include, but are not limited to, calcium naphthenate, lithium neodecanoate, zinc acetate, tin oxide, lithium hydroxide and the like.

Some of the urethanes of the present invention can be formed from the reaction of an isocyanate with hydroxyl functional oil-esters. An isocyanate that can be utilized for producing the urethanes of embodiments of the present invention is diisocyanate. Suitable diisocyanates include, but are not limited to, 1,4-tetramethylene diisocyanate, 1,6-hexamethylene diisocyanate, 2,2,4-trimethyl-1,6-diisocyanatohexane, 1,10-decamethylene diisocyanate, 1,4-cyclohexane diisocyanate, bis (4-isocyanatocyclohexyl) methane, 1-isocyanato-3-isocyanatomethyl-3,5,5,-trimethylcyclohexane, m- and p-phenylene diisocyanate, 2,6-and 2,4-tolyene diisocyanate, Xylene diisocyanate, 4-chloro-1,3-phenylene diisocyanate, 4,4'-bisphenylene diisocyanate, 4,4'-methylene diphenylisocyante, 1,5-naphthylene diisocyanate, 1,5-tetrahydronaphthylene diisocyanate, 1,12-dodecyldiisocyanate, norbomate diisocyanate, 2-methyl-1,5-pentane diisocyanate and mixtures thereof.

According to some of the embodiments of the present invention, the moisture curable functionalized groups of the dual-crosslinking urethanes may include terminal silanes, pendant silanes, terminal isocyanates, pendant isocyanates, and mixtures thereof. In some embodiments, the moisture curable functionalized group is preferably a silane group. The silane groups can be incorporated into the dual-crosslinkable urethane compositions by reacting epoxy-silanes with carboxylic acid groups in the oil-esters, reacting isocyanate-silanes with hydroxyl group in the oil-ester, by reacting amino-silanes with the excess isocyanate groups in isocyanate-terminated prepolymers of a diisocyanate and oil-ester reaction, or by blending polysilanes to the oil-modified urethane. In some embodiments, the reactions used to incorporate the silane groups are carried out in a solvent and the solids content is controlled at not less than about 60 percent.

In other embodiments of the present invention, silane groups may be incorporated into the dual-crosslinking urethane by reacting a urethane with a modified silane having the following formula:

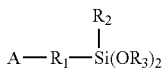

wherein $R_1$ is an alkyl group having 1 to 8 carbons; $R_2$ is selected from the group consisting of a lower alkyl and an alkoxy; $R_3$ is a lower alkyl; and A is a selected from substituted or unsubstituted isocyanate groups, amino groups, or oxirane groups. The alkoxy group can be methoxy, ethoxy or propoxy. The lower alkyl can be methyl, ethyl, n-propyl, iso-propyl, n-butyl, iso-butyl, tert-butyl, and the like. A can be an isocyanate group such as a diisocyanate. A moisture curable group can be added to a urethane such as an isocyanate-silane. The isocyanate-silane can be reacted with a hydroxyl group in a urethane polyol to incorporate the isocyanate-silane into the urethane, which provides the urethane with a moisture curable group.

Exemplary isocyanate-silanes include, but are not limited to, isocyanatopropyltriethoxysilane, isocyanatopropyltrimethoxysilane, and mixtures thereof.

In other embodiments of the present invention, such as where A is an amino group, the modified silane may be incorporated into a urethane by the reaction of the amine group in the amino-silane with an isocyanate in a urethane prepolymer. Amino-silanes that may be used with embodiments of the present invention include, but are not limited to, aminopropyltriethoxysilane, aminopropyltrimethoxysilane, N-(aminoethyl) aminopropyltrimethoxysilane, bis-(trimethoxysilylpropyl)amine, aminoneohexyltrimethoxysilane, N-(aminoethyl) aminopropylmethyldimethoxysilane, aminoneohexylmethyldimethoxysilane, and mixtures thereof.

In yet other embodiments of the present invention, A may be an oxirane group. A modified silane having an oxirane group may be incorporated into a urethane by the reaction of the oxirane group with a carboxylic acid in an ester intermediate prior to or after the isocyanate reaction with the ester. Oxirane-silanes that may be used with embodiments of the present invention include, but are not limited to, glycidoxypropyltrimethoxysilane, 3,4-epoxycyclohexyl ethyltrimethoxysilane, and mixtures thereof.

The incorporation of moisture curable groups such as isocyanate-silanes, amino-silanes, and oxirane-silanes with urethanes may be carried out in a solvent that is inert to the isocyanate and silane groups according to embodiments of the present invention. In other embodiments, a urethane having a moisture curable group can be stored in an inert solvent.

In additional embodiments of the present invention, the dual-crosslinking urethane may be mixed with a low molecular weight reactive silane, which may act as a reactive diluent. The reactive silane diluent can react with the dual-crosslinking urethanes through a moisture cure. For example, the reactive silane diluent can co-react with hydroxyl functionality of an oil-modified urethane. In other embodiments, the reactive silane diluent can co-react with the silane functionality of an oil-modified urethane.

Silanes that can be used as reactive silanes according to embodiments of the present invention include silanes having the formula:

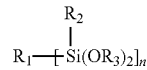

wherein $R_1$ is an alkyl group having 1 to 8 carbons; $R_2$ is selected from the group consisting of a lower alkyl and an alkoxy; $R_3$ is a lower alkyl; and n is an integer greater than or equal to 2. The alkoxy of $R_2$ can be methoxy, ethoxy or propoxy. The lower alkyl can be methyl, ethyl, n-propyl, iso-propyl, n-butyl, iso-butyl, tert-butyl, and the like. For instance, tris(3-(trimethoxysilyl) propyl) isocyanurate can be used as a silane reactive diluent.

According to some embodiments of the present invention, the air oxidation and/or the moisture cure reaction rates of the dual-crosslinkable urethanes can be increased by the addition of a catalyst. For example, catalysts such as metallic carboxylates and dibutyl tin dilaurate may be used. Metallic carboxylates that can be used include cobalt carboxylates, manganese carboxylates, and/or mixtures thereof.

The dual-crosslinkable urethanes of the present invention can be storage stable. For example, the dual-crosslinkable urethanes of embodiments of the invention can be stored for one year, two years, or in some instances three or more years at room temperature.

Embodiments of the present invention can also include dual-crosslinkable urethanes containing a high solids amount. For example, in some embodiments, the oil-modified urethanes of embodiments of the present invention can include 50 percent, 55 percent, 57.5 percent, 60 percent, 61.5, 62.5 percent, or 63.5 percent solids content.

Embodiments of the present invention can also include dual-crosslinkable urethanes including a low amount of volatile organic compounds (VOCs). A low amount of VOCs is considered to be about 350, 325, 300, 275, 250, 225 or 200 grams per liter or less.

The dual-crosslinkable urethanes can be used as coatings, such as wood varnishes. Application of the dual-crosslinkable urethane to a surface can result in the curing of the dual-crosslinkable urethane by crosslinking due to air oxidation and moisture cure to form a crosslinked poly film.

The following Examples are provided to illustrate various embodiments of the present invention but are not meant to limit the embodiments of the present invention in any way.

EXAMPLE 1

Synthesis Of Hydroxyl Function Oil-ester

A hydroxyl functional oil-ester with 159 OHV (eq. wt.=353) was prepared by charging 1000 parts of linseed oil, 118.3 parts of pentaerythritol (Mono PE) and 1.12 parts of dibutyl tin oxide into a clean dry flask equipped with an agitator, thermometer, nitrogen inlet and outlet. The reaction mixture was stirred and heated to 250° C. under a nitrogen atmosphere and then maintained at this temperature for 150 minutes. The resulting oil-ester exhibited an acid value of 1.0 and a hydroxyl value of 159. Each of the hydroxyl function oil-esters used in this Examples 2-8 were prepared in a similar manner except that the amount of pentaerythritol was varied in each of the examples to control the hydroxyl value.

EXAMPLE 2

Preparation Of Dual-crosslinkable Oil-modified Urethane by Using Isocyanate-silane A dual-crosslinkable oil-modified urethane was prepared with an isocyanate-silane. The reaction was initiated by charging 300 parts of oil-ester (prepared in a manner as described in Example 1 with an OHV of 188), 61.5 parts of isocyanatopropyltrimethoxysilane (Silquest A-link 35 silane from GE Silicones), 57.8 parts of toluene diisocyanate, and 257 parts of mineral spirits-1% into a clean dry flask equipped with an agitator, thermometer, nitrogen inlet and outlet, and condenser. The reaction mixture was stirred and gradually heated to 90° C. under a nitrogen atmosphere. Once at 90° C., 0.06 parts of dibutyl tin dilaurate were added to the reaction mixture. An exotherm may occur. The reaction temperature was maintained at 95° C. until the isocyanate content reached zero as determined by IR. The resulting dual-crosslinkable oil-modified urethane exhibited an NV of 62% (VOC<350 g/l) and a viscosity of 2.00 stokes.

EXAMPLE 3

COMPARATIVE EXAMPLE

Preparation of Oil-modified Urethane

An oil-modified urethane lacking dual-crosslinkability was prepared as a control and for comparison to the dual-crosslinkable urethanes of the Examples. The oil-modified urethane was prepared by charging 300 parts of oil-ester (prepared in a manner as described in Example 1 with an OHV of 188), 60 parts of toluene diisocyanate, and 221 parts of mineral spirits-1% into a clean dry flask equipped with an agitator, thermometer, nitrogen inlet and outlet, and condenser. The reaction mixture was stirred and gradually heated to 85° C. under a nitrogen atmosphere. Once at 85° C., 0.053 parts of dibutyl tin dilaurate were added to the reaction mixture. An exotherm may occur. The reaction temperature was maintained at 95° C. until the isocyanate content reached zero as determined by IR. The resulting oil-modified urethane exhibited an NV of 62% (VOC<350 g/l), an OHV of 49 on solids (by calculation) and a viscosity of 2.00 stokes.

EXAMPLE 4

Preparation of Dual-crosslinkable Oil-modified Urethane Containing Isocyanate Groups A dual-crosslinkable oil-modified urethane containing moisture curable isocyanate groups was prepared by charging 330 parts of oil-ester intermediate (Example 1), 122 parts of toluene diisocyanate, and 277 parts of mineral spirits-1% into a clean dry flask equipped with an agitator, thermometer, nitrogen inlet and outlet, and condenser. The reaction mixture was stirred and gradually heated to 85° C. under a nitrogen atmosphere. Once at 85° C., 0.07 parts of dibutyl tin dilaurate were added to the reaction mixture. An exotherm may occur. The reaction temperature was maintained at 85° C. until the isocyanate content was below 2.7 as determined by titration. The resulting dual-crosslinkable oil-modified urethane containing isocyanate groups exhibited an NV of 62% (VOC<350 g/l), an isocyanate content of 2.4%, and a viscosity of 2.75 stokes.

EXAMPLE 5

Comparison Testing

The samples from Examples 2, 3, and 4 were formulated by adding 0.1 parts of Cobalt Nap-All 6%, 1.03 parts of Calcium CEM-All 6%, 0.52 parts of Zirconium Hydro-CEM 12% and 0.31 parts of dibutyl tin dilaurate to 100 parts of the resins. A conventional low VOC (350 g/l VOC) oil-modified urethane control sample (Spenkel F87) was formulated by combining 28 parts of mineral spirits-1%, 0.13 parts of Cobalt Nap-All 6%, 1.33 parts Calcium CEM-All 6%, and 0.67 parts of Zirconium Hydro-CEM 12% to 100 parts of Spenkel F87-80. A second conventional high VOC (450 g/l VOC) oil-modified urethane control sample (Spenkel F77) was formulated by combining 33 parts of mineral spirits-1%, 0.1 parts of Cobalt Nap-All 6%, 1.03 parts of Calcium CEM-All 6%, and 0.52 parts of Zirconium Hydro-CEM 12% into 100 parts of Spenkel F77-60.

Wet films having a thickness of 3 millimeters were applied to glass plates with a doctor blade. The film-coated glass plates were placed in a constant temperature room (77 F. and 50% relative humidity), and the drytime of the films was determined using a Gardner Drytime recorder. Sward hardness of the films was determined using a Sward hardness rocker (ASTM D 2134). The results are shown in Table 1.

TABLE I

| Sample | Example 2 | Example 3 | Example 4 | Spenkel F87 | Spenkel F77 |
| --- | --- | --- | --- | --- | --- |
| Dual-crosslinkable | Yes | No | Yes | No | No |
| VOC (g/l) | 350 | 350 | 350 | 350 | 450 |
| Drytime, hrs | | | | | |
| Set | 1.50 | 2.50 | 2.00 | 1.50 | 1.50 |
| Through | 2.25 | >24 | 2.75 | 16.5 | 1.75 |
| Hard | 3.50 | >24 | 24 | >24 | 3.00 |
| Sward hardness | | | | | |
| 7 days | 28 | 12 | 46 | 10 | 30 |
| 21 days | 34 | 16 | 50 | 16 | 38 |

EXAMPLE 6

Comparison Testing

A dual-crosslinkable oil-modified urethane was prepared using a silane compound as a reactive diluent. The dual-crosslinkable oil-modified urethane was prepared by blending 34.78 parts of hydroxyl functional OMU from Example 3 with 2.40 parts of tris(3-(trimethoxysilyl) propyl) isocyanurate (Silquest Y-1 1597 from GE Silicones) and 1.47 parts of mineral spirits-1%. The resulting mixture exhibited an NV of 62.0% and a viscosity of 1.65 stokes. The mixture was then formulated according to the procedures in Example 5. A sample from Example 3 was used as control using the same drier package. The testing results are shown in Table 2.

TABLE 2

| Sample | Example 3 | Example 6 |
| --- | --- | --- |
| Dual-crosslinkable | No | Yes |
| VOC (g/l) | 350 | 350 |
| Viscosity, stocks | 2.0 | 1.65 |

TABLE 2-continued

| Sample | Example 3 | Example 6 |
|---|---|---|
| Drytime, hrs | | |
| Set | 2.5 | 1.5 |
| Through | >24 | >24 |
| Hard | >24 | >24 |
| Sward hardness | | |
| 7 days | 12 | 18 |
| 21 days | 16 | 24 |

EXAMPLE 7

Preparation of Dual-crosslinkable Oil-modified Urethane by Using Amino-silane

A dual-crosslinkable oil-modified urethane was prepared using an amino-silane. The dual-crosslinkable oil-modified urethane was prepared by charging 250 parts of oil-ester intermediate (Example 1), 61.6 parts of toluene diisocyanate, and 201.2 parts of mineral spirits-1% into a clean dry flask equipped with an agitator, thermometer, dropping funnel, nitrogen inlet and outlet, and condenser. The reaction mixture was stirred under a dry nitrogen atmosphere and 31 parts of Silquest Alink-15 (N-ethyl-3-trimethoxysilyl-2-methylpropanamine from GE Silicones) were added into the flask drop wise while controlling the temperature below 45° C. After adding Alink-15, the reaction mixture was gradually heated to 80° C. Once at 80° C., 0.06 parts of dibutyl tin dilaurate were added to the reaction mixture. An exotherm may occur. The reaction temperature was maintained at 80° C. until the isocyanate content reached zero as determined by IR. The resulting dual-crosslinkable oil-modified urethane exhibited an NV of 62% (VOC<350 g/l) and a viscosity of 2.25 stokes.

EXAMPLE 8

Preparation Of Dual-Crosslinkable Uralkyd by Using Epoxy-silane

An intermediate of dual-crosslinkable urethane was prepared by charging 350 parts of oil-ester prepared in a manner as described in Example 1 and 51.8 parts of phthalic anhydride into a clean dry flask equipped with an agitator, thermometer, nitrogen inlet and outlet. The reaction mixture was stirred and heated to 180° C. under a dry nitrogen atmosphere. The reaction temperature was maintained at 180° C. until the acid value dropped to 20.2. Then 250 parts of the alkyd, 20 parts of glycidoxy propyltrimethoxy silane (Silquest A-187 from GE Silicones) and 0.81 parts of triphenyl phosphine were charged into a clean dry flask equipped with an agitator, thermometer, nitrogen inlet and outlet, and condenser. The reaction mixture was stirred and heated to 130° C. under nitrogen atmosphere. The reaction was maintained at 130° C. for 7 hours and then cooled to room temperature. To this intermediate was charged 22 parts of toluene diisocyanate and 160 parts of mineral spirits-1%. The reaction mixture was gradually heated to 90° C. Once at 90° C., 0.2 parts of dibutyl tin dilaurate were added to the reaction mixture. The reaction temperature was maintained at 90° C. until the isocyanate content reached 0 as determined by IR. The resulting dual-crosslinkable urethane exhibited an NV of 62.2% and a viscosity of 2.37 stokes.

The foregoing is illustrative of the present invention, and is not to be construed as limiting thereof. The invention is defined by the following claims, with equivalents of the claims to be included therein.

What is claimed is:

1. A dual-crosslinkable urethane coating composition comprising:
   an air curable urethane having an ethylenic unsaturated portion;
   at least one moisture curable silane functionalized group; and
   a catalyst for the air oxidation of the ethylenic unsaturation, wherein said dual-crosslinkable urethane coating composition has an isocyanate content of zero, and
   wherein the at least one moisture curable silane functionalized group is incorporated into the urethane through a reaction of an isocyanate-silane with a hydroxyl-terminated urethane polyol.

2. The dual-crosslinkable urethane coating composition of claim 1, wherein the air curable ethylenic unsaturated portion of the urethane comprises air curable ethylenic unsaturation from a dry or semi-dry oil or fatty acid.

3. The dual-crosslinkable urethane coating composition of claim 1, wherein the at least one moisture curable silane functionalized group comprises a terminal or pendent silane group.

4. The dual-crosslinkable urethane coating composition of claim 1, wherein the solids content of the composition is not less than about 60 percent.

5. A method for coating a surface, comprising coating a surface with a composition comprising a dual-crosslinkable urethane coating composition according to claim 1.

6. The dual-crosslinkable urethane coating composition of claim 1, wherein the at least one moisture curable silane functionalized group comprises a low molecular weight reactive silane, wherein the low molecular weight reactive silane comprises the formula

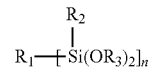

wherein $R_1$ is an alkyl group having 1 to 8 carbons or heterocyclic; $R_2$ is selected from the group consisting of a lower alkyl and an alkoxy; $R_3$ is a lower alkyl; and n is an integer greater than or equal to 2; and wherein the low molecular weight reactive silane comprises at least one isocyanate and/or epoxy functional group; and said dual-crosslinkable urethane coating composition has an isocyanate content of zero.

7. A dual-crosslinkable urethane coating composition comprising:
   an air curable urethane having an ethylenic unsaturated portion;
   at least one moisture curable silane functionalized group; and
   a catalyst for the air oxidation of the ethylenic unsaturation, wherein said dual-crosslinkable urethane coating composition has an isocyanate content of zero, and
   wherein the at least one moisture curable silane functionalized group is incorporated into the urethane through a reaction of an epoxy-silane with carboxylic acid group in a urethane polymer.

8. The dual-crosslinkable urethane coating composition of claim 7, wherein the air curable ethylenic unsaturated portion of the urethane comprises air curable ethylenic unsaturation from a dry or semi-dry oil or fatty acid.

9. The dual-crosslinkable urethane coating composition of claim 7, wherein the at least one moisture curable silane functionalized group comprises a terminal or pendent silane group.

10. The dual-crosslinkable urethane coating composition of claim 7, wherein the solids content of the composition is not less than about 60 percent.

11. A method for coating a surface, comprising coating a surface with a composition comprising a dual-crosslinkable urethane coating composition according to claim 7.

12. The dual-crosslinkable urethane coating composition of claim 7, wherein the at least one moisture curable silane functionalized group comprises a low molecular weight reactive silane, wherein the low molecular weight reactive silane comprises the formula

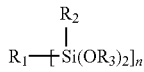

wherein $R_1$ is an alkyl group having 1 to 8 carbons or heterocyclic; $R_2$ is selected from the group consisting of a lower alkyl and an alkoxy; $R_3$ is a lower alkyl; and n is an integer greater than or equal to 2; and wherein the low molecular weight reactive silane comprises at least one isocyanate and/or epoxy functional group; and said dual-crosslinkable urethane coating composition has an isocyanate content of zero.

13. A method of forming a dual-crosslinked urethane, comprising:
reacting an isocyanate with a hydroxyl functional oil-ester to form an air curable urethane polymer having ethylenic unsaturation and incorporating at least one silane group into the urethane to provide a urethane having no isocyanate content; and
curing the air-curable urethane in the presence of moisture, oxygen and a catalyst for the air oxidation of the ethylenic unsaturation,
wherein the hydroxyl functional oil-ester is formed by the esterification of a polyfunctional alcohol with a fatty acid.

14. The method of claim 13, wherein the isocyanate comprises a diisocyanate selected from the group consisting of 1,4-tetramethylene diisocyanate, 1,6-hexamethylene diisocyanate, 2,2,4-trimethyl-1,6-diisocyanatohexane, 1,10-decamethylene diisocyanate, 1,4-cyclohexane diisocyanate, bis(4-isocyanatocyclohexyl) methane, 1-isocyanato-3-isocyanatomethyl-3,5,5,-trimethylcyclohexane, m- and p-phenylene diisocyanate, 2,6-and 2,4-tolyene diisocyanate, xylene diisocyanate, 4-chloro-1, 3-phenylene diisocyanate, 4,4'-bisphenylene diisocyanate, 4,4'-methylene diphenylisocyante, 1,5-naphthylene diisocyanate, 1,5-tetrahydronaphthylene diisocyanate, 1,12-dodecyldiisocyanate, norbornyl diisocyanate, 2-methyl-1,5-pentane diisocyanate and mixtures thereof.

15. The method of claim 13, wherein the polyfunctional alcohol is selected from the group consisting of ethylene glycol, propylene glycol, 1,3 propane diol, 1,3 butylene diol, bisphenol-A, hydrogenated bisphenol-A, trimethylolpropane, trimethylol-ethane, pentaerythritol, glycerin, neopentyl glycol, cyclohexane dimethanol, 2-methyl-1,3-propanediol, 1,6-hexanediol di-pentaerythritol, di-ethylene glycol, tri-ethylene glycol, di-trimethylolpropane, and mixtures thereof.

16. The method of claim 13, wherein the fatty acid is selected from the group consisting of linoleic acids, palmitoleic acids, linolenic acids, eleostearic acids, arachidonic acids, ricinoleic acids, and mixtures thereof.

17. The method of claim 13, wherein the oil-ester is modified with a polyacid selected from the group consisting of isophthalic acid, terephthalic acid, 5-(sodiosulfo)-isophthalic acid, trimellitic anhydride, adipic acid, 1,4-cyclohexyl dicarboxylic acid, succinic anhydride, maleic acid, fumaric acid, succinic acid, azaleic acid, sebacic acid, methyl succinic anhydride, dodecenyl succinic anhydride, tetrahydrophthalic anhydride, hexahydrophthalic anhydride and phthalic anhydride.

18. The method of claim 13, wherein the hydroxyl functional oil-ester has a hydroxyl value of between about 100 and about 250.

19. The method of claim 13, wherein incorporating at least one silane group into the urethane comprises reacting the urethane with a modified silane having the formula

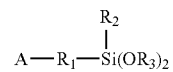

wherein $R_1$ is an alkyl group having 1 to 8 carbons; $R_2$ is selected from the group consisting of a lower alkyl and an alkoxy; $R_3$ is a lower alkyl; and A is a selected from the group consisting of substituted or unsubstituted isocyanate groups and oxirane groups.

20. The method of claim 13, wherein incorporating at least one silane group into the urethane comprises reacting the urethane with a silane selected from the group consisting of an isocyanate-silane and an oxirane silane.

21. The method of claim 13, wherein incorporating at least one silane group into the urethane comprises reacting the urethane with oxirane group selected from the group consisting of glycidoxypropyltrimethoxysilane, 3,4-epoxycyclohexyl ethyltrimethoxysilane, and mixtures thereof.

22. The method of claim 13, wherein incorporating at least one silane group into the urethane comprises reacting the urethane with an isocyanato-silane selected from the group consisting of isocyanatopropyltriethoxysilane, isocyanatopropyltrimethoxysilane, and mixtures thereof.

23. A method of forming a dual-crosslinked urethane, comprising:
reacting an isocyanate with a hydroxyl functional oil-ester to form an air curable urethane polymer having ethylenic unsaturation and incorporating at least one silane group into the urethane to provide a urethane having no isocyanate content; and
curing the air-curable urethane in the presence of moisture, oxygen and a catalyst for the air oxidation of the ethylenic unsaturation,
wherein the hydroxyl functional oil-ester is formed by the transesterification of a polyfunctional alcohol with an oil, wherein at least a portion of the oil is unsaturated.

24. The method of claim 23, wherein the polyfunctional alcohol is selected from the group consisting of ethylene glycol, propylene glycol, 1,3 propane diol, 1,3 butylene diol, bisphenol-A, hydrogenated bisphenol-A, trimethylolpropane, trimethylol-ethane, pentaerythritol, glycerin, neopentyl glycol, cyclohexane dimethanol, 2-methyl-1,3-propanediol, 1,6-hexanediol di-pentaerythritol, di-ethylene glycol, tri-ethylene glycol, di-trimethylolpropane, and mixtures thereof.

25. The method of claim 23, wherein the hydroxyl functional oil-ester has a hydroxyl value of between about 100 and about 250.

26. The method of claim 23, wherein incorporating at least one silane group into the urethane comprises reacting the urethane with a modified silane having the formula

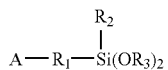

wherein $R_1$ is an alkyl group having 1 to 8 carbons; $R_2$ is selected from the group consisting of a lower alkyl and an alkoxy; $R_3$ is a lower alkyl; and A is a selected from the group consisting of substituted or unsubstituted isocyanate groups and oxirane groups.

27. The method of claim 23, wherein incorporating at least one silane group into the urethane comprises reacting the urethane with a silane selected from the group consisting of an isocyanate-silane and an oxirane silane.

28. The method of claim 23, wherein incorporating at least one silane group into the urethane comprises reacting the urethane with oxirane group selected from the group consisting of glycidoxypropyltrimethoxysilane, 3,4-epoxycyclohexyl ethyltrimethoxysilane, and mixtures thereof.

29. The method of claim 23, wherein incorporating at least one silane group into the urethane comprises reacting the urethane with an isocyanato-silane selected from the group consisting of isocyanatopropyltriethoxysilane, isocyanatopropyltrimethoxysilane, and mixtures thereof.

* * * * *